United States Patent [19]

Child

[11] 4,425,874

[45] Jan. 17, 1984

[54] DISPENSER

[76] Inventor: Francis W. Child, Southfork-Star Rte., Cody, Wyo. 82414

[21] Appl. No.: 372,988

[22] Filed: Apr. 29, 1982

[51] Int. Cl.³ .............................................. A01K 29/00
[52] U.S. Cl. ...................................... 119/156; 40/301
[58] Field of Search .................. 119/156; 40/301, 300, 40/302

[56] References Cited

U.S. PATENT DOCUMENTS

| | | | |
|---|---|---|---|
| 1,203,590 | 11/1916 | Day | 119/156 |
| 3,405,688 | 10/1968 | Gerhardi | 119/156 |
| 4,176,482 | 12/1979 | Steckel | 40/301 |
| 4,359,015 | 11/1982 | Ritchey | 119/156 |

*Primary Examiner*—Jay N. Eskovitz
*Attorney, Agent, or Firm*—Burd, Bartz & Gutenkauf

[57] ABSTRACT

An insecticide dispenser attachable to the ear of an animal has a ball shaped body accommodating insecticide. The body has a slit providing a mouth that can be opened allowing access to the inside of the body. A connector having a pin secures the body to the ear. Annular resilient members surround the pin adjacent opposite sides of the ear minimize snagging of the dispenser on objects.

20 Claims, 6 Drawing Figures

DISPENSER

FIELD OF INVENTION

The invention relates to insecticide dispensers adapted to be attached to an ear of an animal for controlling horn and face flies and ticks.

BACKGROUND OF INVENTION

Tags attached to ears of animals, such as dairy, beef cattle, and hogs, have been used to identify the animals. The tags have a generally flat plastic body joined to a connector adapted to be attached to the ear of an animal. Examples of this type of ear tag are shown in U.S. Pat. Nos. 3,552,051 and 3,934,368. Insect repellents and insecticides have been impregnated into the plastic of ear tags for controlling insects that are attracted to the animals. The effectiveness of the insecticide on these ear tags is of a limited duration. After a period of time, the tags are not effective to control the insects. The tags must be removed from the animal and replaced with new insecticide carrying tags. This is a costly and time-consuming procedure. If the tags are not removed, other types of insecticide control programs must be used.

SUMMARY OF INVENTION

The invention is an insecticide dispenser or apparatus adapted to be attached to an ear of an animal, such as dairy and beef cattle. The insecticide dispenser can be attached to other parts of the animal, such as the dewlap of a heifer. The apparatus has a body accommodating an insecticide carrying means. The herdsman or rancher can select the type of insecticide that is to be used with the insecticide carrying means. Liquid insecticides, such as Rabon, Ectrin, and synthetic pyrethroids, can be incorporated into the means for accommodating insecticide. Additional insecticide can be introduced into the means for accommodating insecticide during the fly and trick season to provide for continuous and effective insect control. The apparatus is attached to the ear of the animal so that the animal, upon movent of its head, will distribute insecticide over the front portions of its body. The animals will also distribute insecticide on each other when they come in contact with each other.

The body is preferably a hollow spherical member having an inside chamber. The chamber accommodates core means of material that absorbs and retains liquid insecticide, such as Rabin, Ectrin, synthetic pyrethroids and the like. An out side portion of the body has a slit providing a normally closed mouth. The body is a resilient plastic hollow ball that holds the mouth closed. The body is subjected to a compressing or squeezing force in the direction of the length of the slit to open the mouth. The open mouth provides access to the core means allowing introduction of additional insecticide into the chamber of the body. A connector means attaches the body to the ear of the animal. The connector means has a head located inside of the chamber and engageable with the wall and a pin that projects through the wall and a hole in the ear. A collar mounted on the pin holds the connector in assembled relation with the ear.

An annular member of resilient material is located between the body and the ear. The annular member functions as a shield or guard to minimize the snagging and catching of the body on grass, a fence, wire, branches, under bushes, and the like. The annular member, being of resilient materials, also minimizes the irritation of the body on the ear.

A washer of resilient material is located between the collar and the ear. The washer has a central recess accommodating the collar. The washer is a resilient shield or guard that minimizes the snagging and catching of the collar on objects, such as wire, branches, grass, under brush, and the like.

An object of the invention is to provide an insecticide dispenser that is attachable to an ear of an animal that can be recharged periodically with insecticide without removing or replacing the dispenser. Another object of the invention is to provide shields for animal ear tags which minimize the catching and snagging of the ear tags on wire, branches, grass, and the like. A further object of the invention is to provide an animal ear tag that is attractive in appearance and useable to identify an animal and is low-cost and effective in dispensing insecticide onto the body of the animal. These and other objects and advantages of the invention are embodied in the following description and drawings.

IN THE DRAWINGS

DESCRIPTION OF PREFERRED EMBODIMENT

Figure 1:
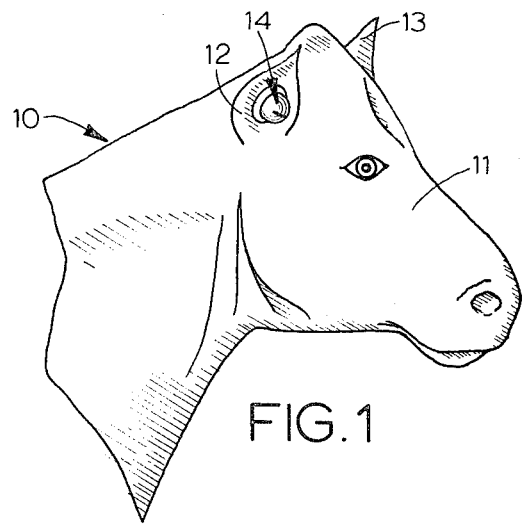
FIG. 1 is an illustration of the head of an animal having ears and the insecticide dispenser of the invention attached to an ear.
Figure 2:
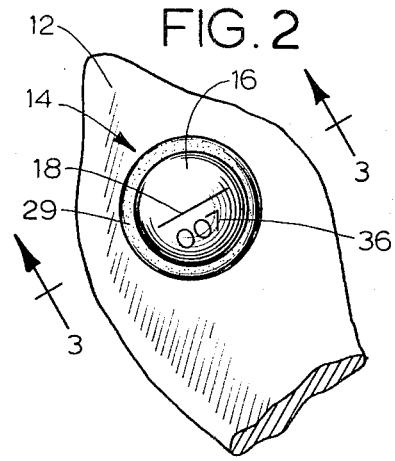
FIG. 2 is an enlarged front elevational view of the ear of the animal of FIG. 1 carrying the insecticide dispenser.

Referring to FIG. 1, an animal indicated generally at 10, such as dairy or beef cattle, is provided with the insecticide dispenser of the invention indicated generally at 14. Animal 10 has a head 11 with two upwardly and forwardly directed ears 12 and 13. Insecticide dispenser 14 is attached to ear 12. As shown in FIG. 2, the insecticide dispenser 14 is located generally in the central portion of ear 12. Ear 13 can be provided with a second insecticide dispenser. Dispenser 14 can be attached to other parts of the body of an animal, as the dewlap of a heifer. Also, dispenser 14 is usable with all species of animals including homo sapiens. The dispenser can accommodate materials, as deodorants, perfumes and insect repellants. The dispenser can be attached to clothing or supports. The following description is directed to dispenser 14 mounted on the ear of an animal.

Figure 3:
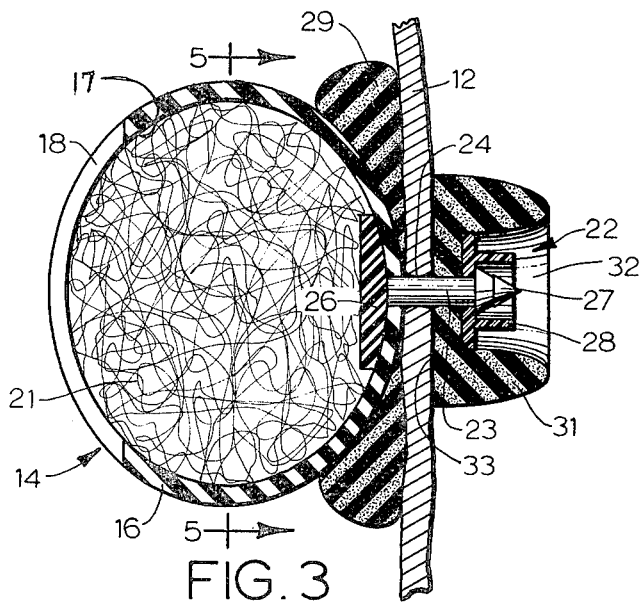
FIG. 3 is an enlarged sectional view taken along the line 3—of FIG. 2.
Figure 4:
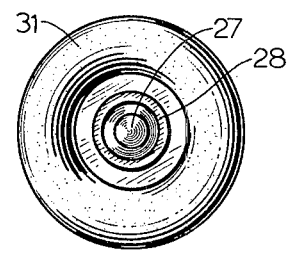
FIG. 4 is an elevational view of the right side of FIG. 3.
Figure 5:
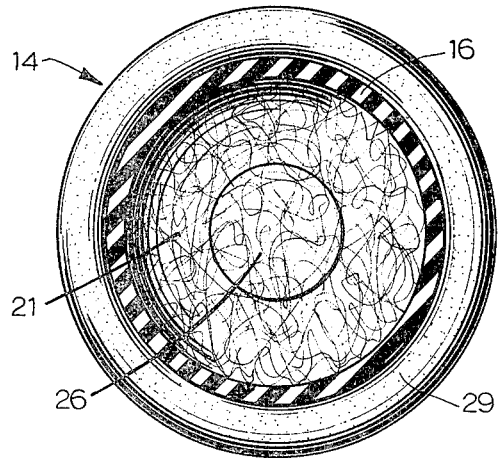
FIG. 5 is a sectional view taken along the line 5—5 of FIG. 3.

Referring to FIGS. 2, 3, and 5, insecticide dispenser 14 has a hollow body 16 having an inside chamber 17 accommodating insecticide carrying material or core 21. Body 16 is a hollow spherical member or ball having a spherical wall of flexible plastic material. The plastic material has a porisity that allows limited seepage or flow of liquid insecticide so that, when the body 16 is rubbed on the coat of the animal, insecticide is transferred to the animal.

Figure 6:
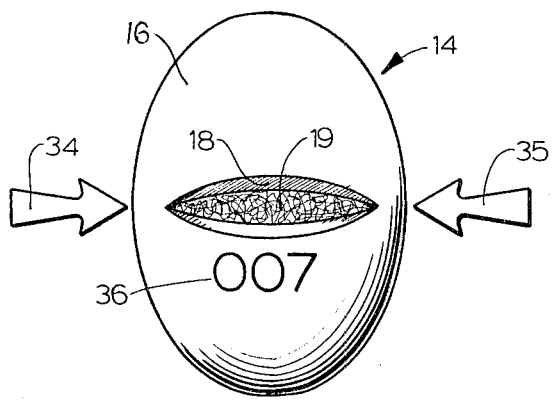
FIG. 6 is a front elevational view of the insecticide dispenser illustrating the method of opening the mouth in the body of the dispenser.

As shown in FIGS. 2 and 3, the outer portion of body 16 has a linear slit 18 having an arcuate length of about 45 degrees. Slit 18 can have other shapes and sizes. The flexible plastic material of body 16 holds slit 18 closed, as shown in FIG. 2. As shown in FIG. 6, slit 18 can be opened to form a mouth 19 open to core material 21. Mouth 19 is opened by compressing or squeezing body 16 in opposite direction in the linear direction of slit 18. Body 16 will deform to open mouth 19. When the mouth 19 is open, as shown in FIG. 6, additional insecticide can be introduced into core material 21. Core material 21 is a fiber that fills chamber 17. Foam plastic materials can be used as the core material 21. Material 21 retains liquids, as liquid insecticide, and slowly releases the liquid into chamber 17.

Body 16 is attached to ear 12 with a connector indicated generally at 22. Connector 22 comprises a linear pin 23 extended through a hole 24 in ear 12. Pin 23 is attached to a head 26 located within chamber 17 of body 16. Head 26 engages a portion of the wall of body 16 to hold the body adjacent to ear 12. The forward end of pin 23 has an enlarged conical point 27 cooperating with a cup-shaped collar 28. Point 27 is moved through the base of the cup-shaped collar 28 to clamp the connector to ear 12.

An annular member or ring 29 of flexible plastic material is interposed between body 16 and ear 12. Ring 29 is preferably a resilient foam plastic member. Ring 29 has a generally flat circular surface that engages one side of ear 12. The outside of ring 29 is deformed to follow the spherical shape of body 16. Ring 29 functions as a flexible shield and guard which minimizes the collection and snagging of objects, such as wire, branches, grasses, underbrush, and the like, between body 16 and ear 12. Prior animal ear tags have space between the body of the tag and the ear supporting the tag. Objects in the environment of the animal will snag and wrap around the tags. This can cause serious damage to the ear and separation of the tag from the ear.

A cup-shaped washer 31 is interposed between collar 28 and the back side of ear 12. Washer 31 has a central recess 32 accommodating the collar 28. The inside of washer 31 has a flat surface 33 engageable with the ear 12. The surface 33 can be provided with a coating of antiseptic materials to minimize the irritation and infection of ear 12. Washer 31 is preferably a resilient foamed plastic material. Washer 31, being of resilient material, minimizes the snagging and collection of objects about pin 28 and collar 28. The ring 29 and washer 31, being of a flexible material, such as foamed plastic, foamed rubber, and the like, also function as insecticide carriers. The insecticide retained in the ring and washer will be distributed to the animal when it is rubbed against the body of the animal or an adjacent animal.

Referring to FIG. 6, in use, it is periodically desirable to recharge or refill body 16 with insecticide. This is done with an injector, such as a hand pump, having a discharge tube. Body 16 is subjected to forces in opposite directions, as indicated by the arrows 34 and 35, adjacent opposite ends of the slit 18. The resilient body 16 will deform, opening mouth 19. The liquid insecticide is introduced into core material 21 through open mouth 19. When the forces indicated by arrows 34 and 35 are released, the resilient memory of the body will return it to its generally cylindrical shape. This closes the mouth 19. The open mouth 19 is also used to accommodate a tool that engages connector head 16 and collar 28. The tool forces pin 23 through ear 12 and conical point 27 in operative engagement with collar 28.

An identification number 36 is applied to a section of the outside of body 16. Body 16 can be color coded for animal identification.

While there has been shown and described an embodiment of the insecticide dispenser of the invention attached to the ear of an animal, it is understood that changes in the structure, materials, and shapes can be made by those skilled in the art without departing from the invention. The invention is defined in the following claims.

The embodiments of the invention in which an exclusive property or priviledge is claimed are defined as follows:

1. An apparatus accommodating liquid insecticide adopted to be attached to the ear of an animal comprising:
   a body having a flexible wall surrounding a chamber,
   means located in the chamber for retaining liquid insecticide,
   said wall being made of material having a porosity that allows limited seepage of liquid insecticide to the atmosphere, said wall having at least one slit providing a normally closed mouth, said mouth being opened upon application of force to said wall whereby liquid insecticide can be introduced into said chamber, and
   connector means operable to attach the body to an ear of the animal.

2. The apparatus of claim 1 wherein: said wall has a generally spherical shape, said slit having an elongated linear shape.

3. The apparatus o claim 1 wherein: the wall has a generally spherical shape, and said slit being in a portion of the wall providing a mouth open to said chamber.

4. The apparatus of claim 1 including: an annular member of resiient material locatable between the body and the ear.

5. The apparatus of claim 4 wherein: the annular member has a generally flat surface adapted to engage the ear.

6. The apparatus of claim 1 wherein: the connector means includes a pin adapted to project through a hole in the ear, and a collar mounted on the pin to hold the pin on the ear.

7. The apparatus of claim 6 including: washer means of resilient material located between the collar and ear.

8. The apparatus of claim 7 wherein: the washer means has a recess for accommodating the collar.

9. The apparatus of claim 1 including: an annular member of resilient material located between the body and one side of the ear, and washer means of resilient materials located adjacent the other side of the ear.

10. The apparatus of claim 1 wherein: the body has a generally spherical wall surrounding said chamber, said connector means compress a head located in the chamber and engagable with said wall, a pin connected to the head extended through said wall and a hole in the ear, and collar means connected to said pin.

11. The apparatus of claim 10 including: an annular member of resilient material located about said pin and between the body and one side of the ear.

12. The apparatus of claim 10 including: washer means surrounding the pin and located between the collar means and the ear.

13. The apparatus of claim 12 wherein: the washer means has a recess for accommodating the collar means.

14. The apparatus of claim 10 including: an annular member of resilient material located about the pin between the body and one side of the ear, and washer means of resilient material located about the pin between the collar means and the other side of the ear.

15. The apparatus of claim 14 wherein: said washer means has a recess for accommodating the collar means.

16. The apparatus of claim 1 wherein: said slit is a single linear slit in the wall providing a normally closed mouth adapted to be opened to provide an opening into said chamber.

17. An apparatus for accommodating odor-generating material comprising: body means having flexible wall means surrounding a chamber, means located in said chamber for storing odor-generating material, said wall means being made of material having a porosity that allows limited flow of ordor-generating material through the wall means to the atmosphere, said wall means having at least one slit providing a normally closed mouth, said mouth being opened upon application of force to said wall means whereby odor-generating material can be introduced into said chamber.

18. The apparatus of claim 17 wherein: said wall means has a generally spherical shape, and said slit comprising a single linear slit providing said normally closed mouth.

19. The apparatus of claim 17 wherein: said slit is a single linear slit through said wall means providing a normally closed mouth.

20. The apparatus of claim 17 including: means connected to the wall means for attaching the wall means to a support.

* * * * *

UNITED STATES PATENT AND TRADEMARK OFFICE
CERTIFICATE OF CORRECTION

PATENT NO. : 4,425,874

DATED : January 17, 1984

INVENTOR(S) : Francis W. Child

It is certified that error appears in the above-identified patent and that said Letters Patent is hereby corrected as shown below:

Column 1, line 41, "trick" should be -- tick --.

Column 1, line 44, "moveent" should be -- movement --.

Column 2, line 31, "line 3" should be -- line 3-3 --.

Column 4, line 32, "o" should be -- of --.

Column 4, line 36, "resiient" should be -- resilient --.

Signed and Sealed this

Third Day of July 1984

[SEAL]

Attest:

GERALD J. MOSSINGHOFF

Attesting Officer

Commissioner of Patents and Trademarks